July 12, 1932. E. MILLER 1,867,519
HEATER
Filed Sept. 23, 1929 2 Sheets-Sheet 2
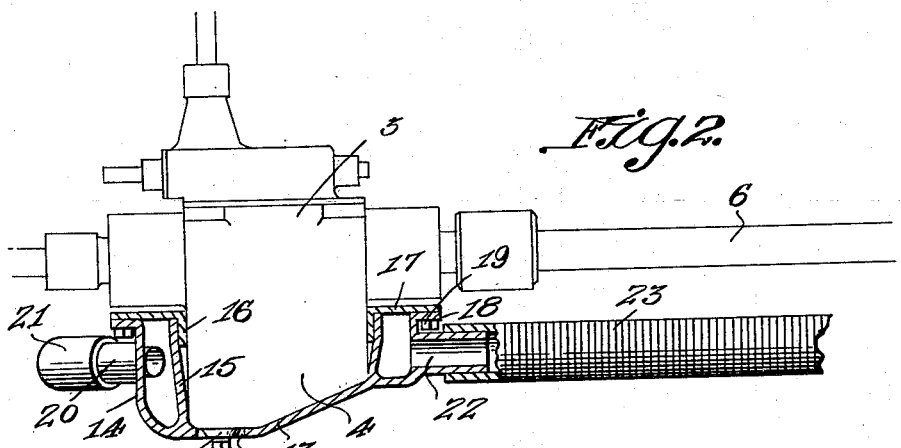
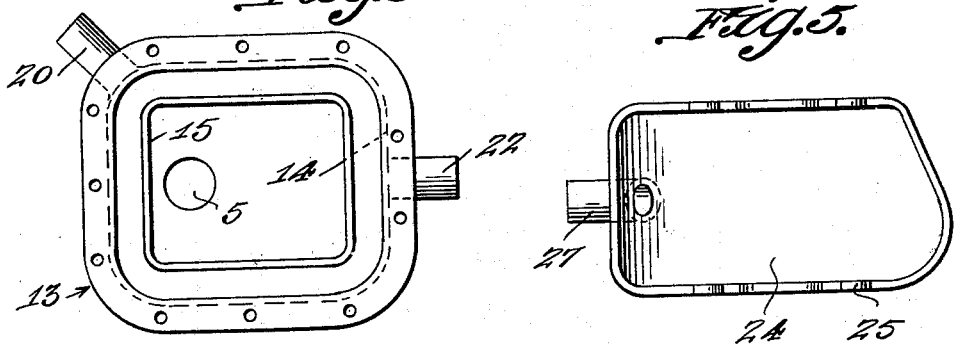
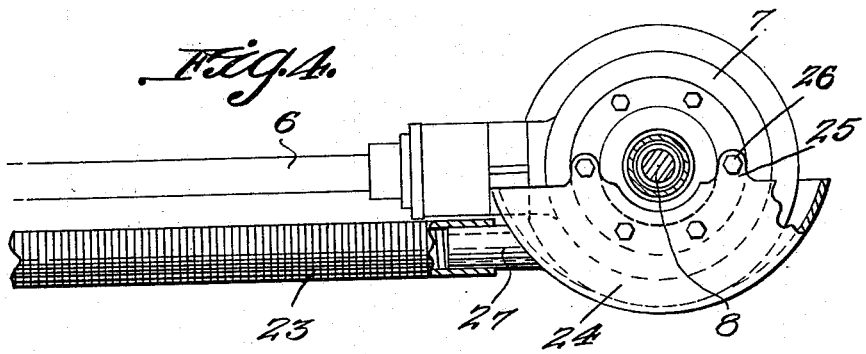
Edward Miller,
INVENTOR.
BY Victor J. Evans
ATTORNEY.

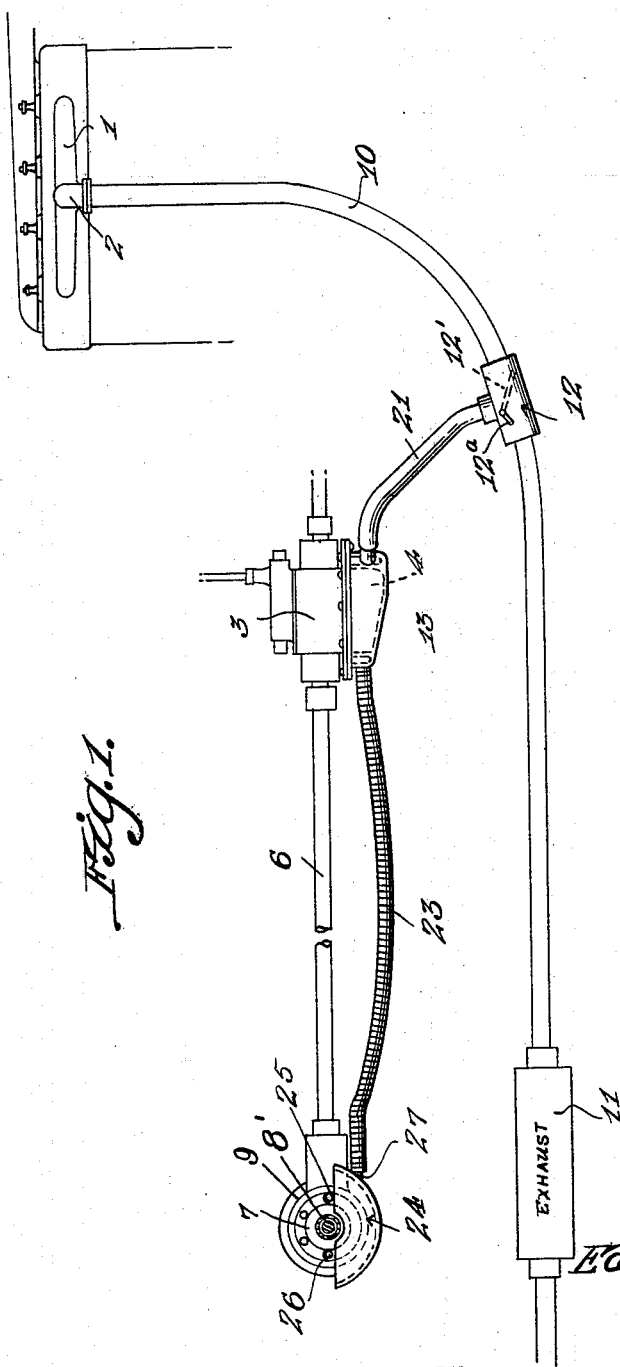

Patented July 12, 1932

1,867,519

UNITED STATES PATENT OFFICE

EDWARD MILLER, OF PORTLAND, NORTH DAKOTA

HEATER

Application filed September 23, 1929. Serial No. 394,560.

This invention relates to a novel heating apparatus for employment in connection with automobiles and the primary object of the invention is to utilize the heat from the exhaust of the engine to prevent freezing of grease in the transmission and differential housings. It is a well known fact that in the winter months transmission and differential gears, and particularly the latter, are broken and torn loose due to freezing of the grease in the housings for the transmission and the differential gearing and therefore the invention contemplates the utilization of the heat from the exhaust manifold of the engine, which is ordinarily wasted, to supply heat to the transmission and differential housings of an automobile and to thereby avoid stripping or other damage to the gears.

Another object of the invention is to provide a heating apparatus for the purpose stated which may be readily installed at low expense upon any of the various makes of automobiles without any material alteration of any part of the heating apparatus.

Another object of the invention is to provide a heating apparatus for the purpose stated so constructed that its presence will not in any way interfere with the proper functioning of the differential and transmission gearing.

With the foregoing and other objects in view, the invention consists in the novel construction and arrangement of elements disclosed, it being understood that modifications may be made within the scope of the claims without departing from the spirit of the invention.

In the drawings forming part of this application:

Figure 1 is a side elevation of the apparatus, the view illustrating, schematically the manner in which the component parts of the apparatus are assembled with the various parts of the automobile upon which the apparatus is installed.

Figure 2 is a detail view illustrating the heating unit for the transmission housing, the transmission housing and associated parts being shown in elevation.

Figure 3 is a plan view of the heating chamber or jacket for this part of the automobile.

Figure 4 is a view in side elevation and partly in section illustrating the part of the apparatus which is associated with the differential gear case.

Figure 5 is a plan view of the jacket of this part of the apparatus.

In the drawings there is illustrated, schematically, the parts of an automobile with which parts of the apparatus embodying the invention are to be assembled and Figure 1 which is a view illustrating all of these parts and the companion or associated parts of the apparatus of the invention, the exhaust manifold of the invention is indicated by the numeral 1 and is provided with the usual outlet spout indicated by the numeral 2. The transmission of the automobile gear system is indicated in general by the numeral 3 and includes the usual grease containing compartment 4 provided with the usual drain plug 5. The numeral 6 indicates the shaft which leads from the transmission 3 to the differential which is indicated by the numeral 7, one of the rear axle sections being indicated by the numeral 8 and the casing or housing for the usual gearing being indicated by the numeral 9.

Ordinarily the exhaust gas is lead from the exhaust manifold 1, by way of a pipe 10, to a muffler 11 and discharged to the atmosphere, but the present invention contemplates, as before stated, the utilization of this exhaust or more specifically the heat thereof for supplying heat to the housing for the transmission 3 and the housing for the differential 7. The numeral 12 indicates a cut out which is interposed in the pipe 10 and at a point in advance of the transmission housing 3. The bottom of the jacket is formed with an opening 5' of sufficient diameter to accommodate the plug 5.

The transmission heating unit of the apparatus is indicated in general by the numeral 13 and the same includes a casing or jacket which is preferably provided with outer walls 14 and inner walls 15, the jacket being generally, exteriorly of a contour corresponding to that of the bowl or lower portion of the housing for the transmission gearing 3 so that the jacket may be fitted to the lower portion of bowl 4 of the transmission housing as shown most clearly in Figure 2 of the drawings. The numeral 16 indicates a ring which is fitted about the upper end of the bowl portion 4 of the housing 3 and which has an outwardly extending flange indicated by the numeral 17, the wall 15 of the jacket being provided with an outstanding flange or a plurality of ears 18 thru which the flange 17 has secured bolts indicated by the numeral 19, the jacket being in this manner mounted upon the transmission housing so that its wall 14 will surround the bowl portion 3 of said housing.

The walls 14 and 15 are spaced as best shown in Figures 2 and 3 of the drawings and a knuckle 20 projects from the forward side of the wall 15 and has fitted to it one end of a pipe 21 which leads downwardly and forwardly and communicates with the casing of the cut out 12. At its rear side, the wall 15 of the jacket is provided with a nipple 22 to which is connected one end of a flexible tube 23, the other end of the tube being connected, in a manner which will presently be described. This pipe 23 is, as stated flexible, and it extends below the shaft 6 and as most clearly shown in Figure 1 of the drawings, is sagged between its ends so as to compensate for up and down movement of the rear axle 8 and the differential 7.

The jacket for the transmission case is indicated by the numeral 24 and is preferably of the form shown in Figures 4 and 5 of the drawings, the same being adapted to be disposed to enclose substantially the lower half of the pintle housing 7 and being provided at the upper edges of its side wall with upstanding ears 25 thru which are passed the suitably located bolts 26 which are provided for securing the side walls of the differential housing in place. At its forward side the jacket 24 is provided with a spout 27 to which is connected the delivery end of the flexible tube 23.

The cut out 12 is of the ordinary type and it will be understood that the valve plate 12' thereof may be adjusted by the usual handle 12a to assume the dotted line position shown in Figure 1 or a more elevated position substantially in alignment with the lower portion of the pipe 10 where the pipe connects with the cut out casing.

Assuming that the apparatus has been installed in the manner illustrated in Figure 1 of the drawings and that the automobile is to be driven in winter weather, the valve plate of the cut off valve 12 is adjusted to the position shown in Figure 1. With the cut off valve thus adjusted, the exhaust gases delivered from the manifold 1 and by way of the nozzle 2 to the pipe 10, will be conducted by the pipe to the casing of the cut off valve and delivered thru the pipe 21 into the jacket of the heating unit for the transmission 3, the hot exhaust gases circulating within the space between the inner and outer walls of the jacket of the said unit and a portion of the heat being transmitted to the bowl 4 of the transmission housing 3, the grease in the said bowl being in this manner maintained in an entirely fluid condition and prevented from freezing. From the jacket of the heating unit 13, the exhaust is transmitted by the flexible tube 23 to the jacket of the heating unit for the differential 7 and inasmuch as the circumferential wall of the jacket is spaced with respect to the corresponding wall of the housing for the differential, the hot exhaust gases will circulate about the underside of the said differential housing and thus maintain the grease therein, in a fluid condition as described in connection with the transmission unit. In warm weather, where it is not necessary that the housings of the transmission and differential be heated, the cut off valve may be adjusted so that the valve plate will occupy a position elevated with respect to the position shown in dotted lines in Figure 1 thereby permitting the direct flow of the exhaust gases thru the pipe 10 and thru the exhaust muffler 11.

It will be understood of course that where the heating apparatus embodying the invention is to be applied to different makes of cars, slight changes in the shape of the heater jackets and other parts may be found necessary. For example, in cars where the direction shaft is exposed, the flexible tube 23 must be made of sufficient length to permit of its being supported at a point between the jackets 13 and 24 and yet in a manner such as to permit of free flexing of the tube in the up and down displacement of the rear axle.

It will be noted that while the jacket 13 is completely closed, the jacket 24 is open at its top, and this presents a decided advantage for the reason that there is no likelihood of loss of any of the hot exhaust gases by way of the atmosphere, at this point, whereas, after the gases have passed thru the flexible tube 23 to the jacket 24 and have circulated around the lower portion of the differential housing, they escape to the atmosphere.

What is claimed is:—

1. In a heating system for motor vehicles, the combination with the exhaust of the engine of the vehicle and the transmission housing, of a plate of rectangular form having an opening and a depending flange surrounding the opening, the plate being fitted to the housing, a jacket having spaced circumferential walls and a bottom, the inner walls of the jacket fitting the flanges and extending about the sides of the housing, and the space between the inner and outer walls of the jacket constituting a circulating space, and means for conducting exhaust gases from the exhaust of the engine to the circulating space of the said jacket.

2. A heating device of the character described comprising in combination, a jacket designed to receive a portion of the transmission case of an automobile, and having a closed continuous heat receiving passage therein, a second heat receiving jacket designed to partly embrace the differential casing of the automobile, in spaced relation thereto and opening at its upper end to the atmosphere, a heat supply pipe communicating with the first mentioned jacket, and a pipe establishing communication between the respective jackets, whereby the heat will pass from the closed passage of one jacket to the atmosphere through the second mentioned jacket.

EDWARD MILLER.